United States Patent [19]

Nogami

[11] 4,198,100
[45] Apr. 15, 1980

[54] HYDRAULIC BRAKE PRESSURE CONTROL DEVICE FOR VEHICLES

[75] Inventor: Tomoyuki Nogami, Toyota, Japan

[73] Assignee: Toyota Jidosha Kogyo Kabushiki Kaisha, Toyota, Japan

[21] Appl. No.: 20,100

[22] Filed: Mar. 13, 1979

[30] Foreign Application Priority Data

Jun. 30, 1978 [JP] Japan .................................. 53/80055

[51] Int. Cl.² .......................... B60T 8/14; B60T 8/24; B60T 8/26
[52] U.S. Cl. .................................. 303/6 C; 303/24 C; 303/24 F
[58] Field of Search ........................ 303/6 C, 6 R, 24; 188/349, 352

[56] References Cited

U.S. PATENT DOCUMENTS

| 3,771,835 | 11/1973 | Yabuta | 303/6 C |
|---|---|---|---|
| 3,913,619 | 10/1975 | Aulner, Sr. et al. | 188/352 X |
| 3,937,523 | 2/1976 | Ayers, Jr. et al. | 303/6 C |
| 4,072,363 | 2/1978 | Tomoyuki | 303/24 C |

Primary Examiner—Douglas C. Butler
Attorney, Agent, or Firm—Kenyon & Kenyon

[57] ABSTRACT

An hydraulic brake pressure control device includes an inertia-controlled valve adapted to control the braking pressure applied to rear wheel brake cylinders from a master cylinder in accordance with the rate of deceleration of the vehicle. In the control device, a bypass passage is provided to facilitate air-purge from the inertia-controlled valve assembly during charge of brake fluid to the braking system, and a check valve is arranged to open and close the bypass passage in such a manner that braking force distribution ratio between the front and rear wheel brake cylinders can be accorded with an ideal distribution ratio characteristic curve.

4 Claims, 3 Drawing Figures

Master Cylinder Pressure Pm

4,198,100

HYDRAULIC BRAKE PRESSURE CONTROL DEVICE FOR VEHICLES

BACKGROUND OF THE INVENTION

The present invention relates to hydraulic brake pressure control devices of the type in which an inertia-controlled valve is adapted to control the braking pressure applied to rear wheel brake cylinders from a master cylinder in accordance with the rate of deceleration of the vehicle, and more particularly to an improvement of such an hydraulic brake pressure control device as disclosed in U.S. Pat. No. 4,072,363 dated Feb. 7, 1978.

SUMMARY OF THE INVENTION

The primary object of the present invention is to provide an improved hydraulic brake pressure control device in which a bypass passage is provided to facilitate air-purge from the inertia-controlled valve assembly during charge of brake fluid to the brake system.

Another object of the present invention is to provide an improved hydraulic brake pressure control device, having the above-mentioned characteristics, in which a check valve is arranged to open and close the bypass passage in such a manner that braking force distribution ratio between the front and rear wheel brake cylinders can be accorded with an ideal distribution ratio characteristic curve.

A further object of the present invention is to provide an improved hydraulic brake pressure control device, having the above-mentioned characteristics, in which even when an accident or breakage occurs within the hydraulic circuit for the front wheel brake cylinders, the check valve acts to open the bypass passage to ensure the braking effort of the rear wheel brake cylinders.

According to the present invention, there is provided an hydraulic brake pressure control device for incorporation in a vehicle braking system including a tandem master cylinder, a first hydraulic circuit connecting a first pressure chamber of the master cylinder to front wheel brake cylinders, and a second hydraulic circuit connecting a second pressure chamber of the master cylinder to rear wheel brake cylinders, which device comprises:

A housing for interposition within the second hydraulic circuit, the housing being provided with an inlet port for connection to the second pressure chamber of the master cylinder, an outlet port for connection to the rear wheel brake cylinders, a valve chamber communicating at one end thereof with the inlet port and at the other end thereof with the outlet port, a bypass passage communicating between the valve chamber and the outlet port to permit the escape of air from the valve chamber, and a stepped bore coaxial with the bypass passage, the bore having a small diameter portion opening towards the bypass passage and a large diameter portion for interposition within the first hydraulic circuit;

a cut-off valve assembly including (a) a valve seat provided in the valve chamber to permit the flow of fluid between the inlet and outlet ports, and (b) an inertia-controlled valve element located within the valve chamber to co-operate with the valve seat to interrupt the flow of fluid from the inlet port to the outlet port when the valve element is subjected to a deceleration in excess of a predetermined value;

a stepped piston reciprocable in a limited stroke within the stepped bore to form a fluid chamber disposed within the first hydraulic circuit, the piston being exposed at the smaller end thereof in the small diameter portion of the bore and at the larger end thereof in the fluid chamber;

a check valve including a second valve seat provided in the small diameter portion of the bore to permit the flow of fluid through the bypass passage, and a valve element reciprocable within the small diameter portion of the bore to co-operate with the second valve seat to open and close the bypass passage; and resilient means interposed between the valve element and the piston to engage the valve element with the second valve seat when the piston is moved towards the bypass passage due to the pressure in the fluid chamber.

BRIEF DESCRIPTION OF THE DRAWINGS

The above and other objects, features and advantages of the present invention will become more readily apparent from the following description of a preferred embodiment with reference to the accompanying drawings, in which.

DESCRIPTION OF THE PREFERRED EMBODIMENT

Figure 1:
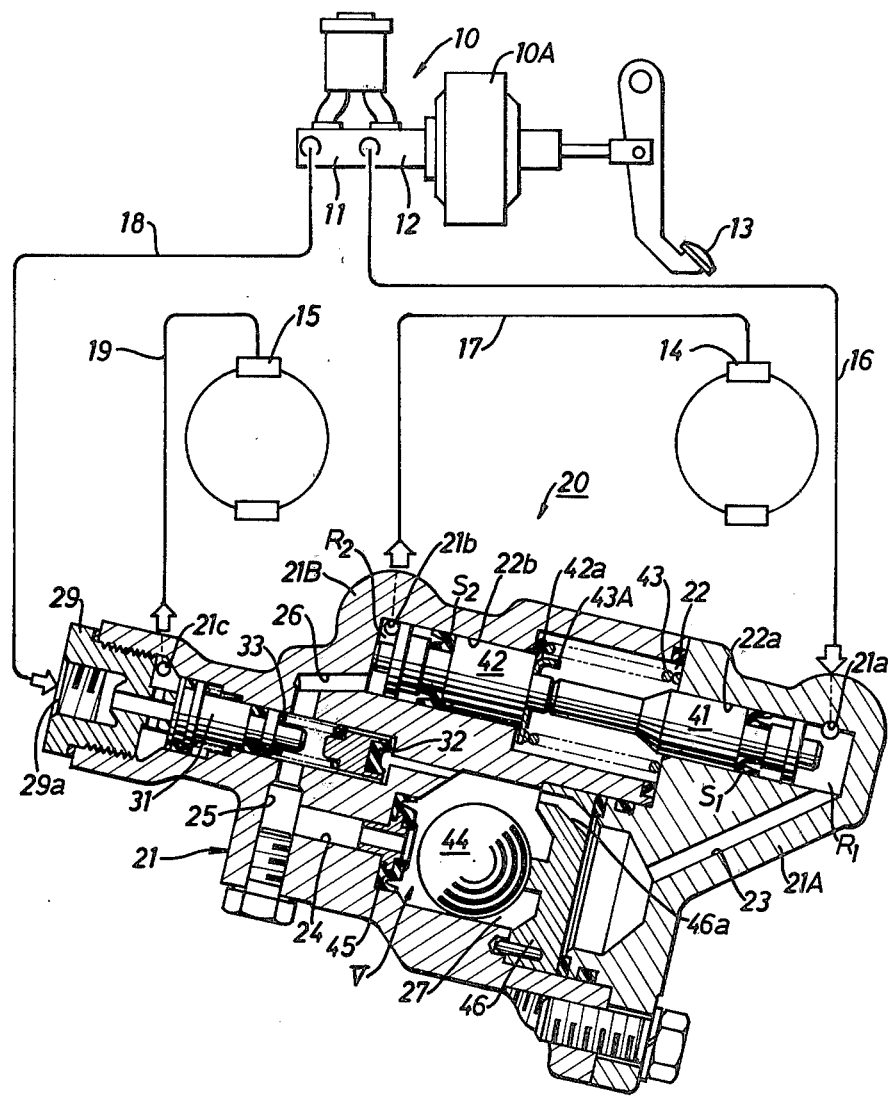
FIG. 1 is a schematic illustration of a vehicle braking system including an hydraulic brake pressure control device of the present invention.

Referring now to the drawings, particularly in FIG. 1 there is illustrated a conventional tandem master cylinder 10 which is equipped with a pneumatic brake booster 10A to be operated by depression of a foot brake pedal 13. The master cylinder 10 is provided with front and rear pressure chambers 11 and 12, the former chamber being connected to front wheel brake cylinders 15 by way of conduits 18, 19, and the latter chamber being connected to rear wheel brake cylinders 14 by way of conduits 16, 17. Disposed among the conduits is an hydraulic brake pressure control device 20 of inertia responsive type in accordance with the present invention.

The control device 20 is fixedly mounted under the vehicle body floor (not shown) at an inclined angle. The control device 20 comprises a housing assembly 21 which is provided therein with a small diameter piston 41, a large diameter piston 42 and an inertia-controlled ball 44. The housing assembly 21 includes a rear housing 21A provided with an inlet port 21a and a front housing 21B provided with an outlet port 21b. The inlet port 21a is connected to the rear pressure chamber 12 of master cylinder 10 by way of conduit 16, and the outlet port 21b is connected to the rear wheel brake cylinders 14 by way of conduit 17. Within the housing assembly 21 there are provided in parallel a stepped cylindrical bore 22 and a valve chamber 27. The stepped cylindrical bore 22 includes a small diameter portion 22a into which the inlet port 21a opens and a large diameter portion 22b into which the outlet port 21b opens. The valve chamber 27 communicates at one hand thereof with the small diameter portion 22a of bore 22 through a passage 23 and at the other hand thereof with the large diameter portion 22b of bore 22 through passages 24, 25 and 26.

Figure 3:
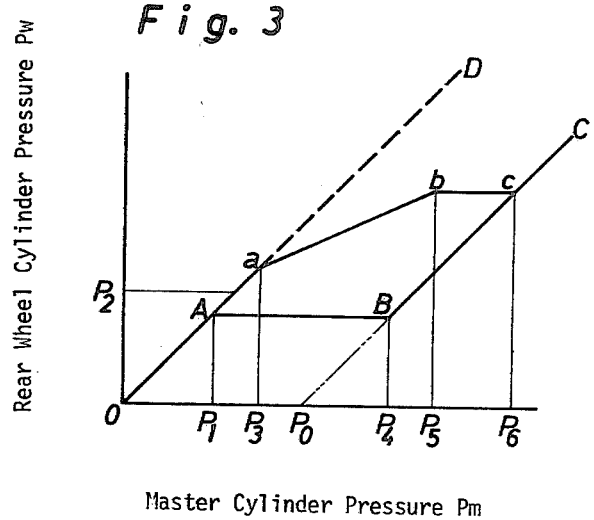
FIG. 3 is a graph showing the pressure controlling characteristics of the control device of FIG. 1.

The small diameter piston 41 is reciprocably engaged within the small diameter portion 22a of bore 22 via an annular seal member $S_1$ to form a first fluid chamber $R_1$ into which the inlet port 21a opens directly. The valve chamber 27 is connected to the first fluid chamber $R_1$ by way of the passage 23. The large diameter piston 42 is reciprocably engaged within the large diameter portion 22b of bore 22 via an annular seal member $S_2$ to form a second fluid chamber $R_2$ into which the outlet port 21b opens directly. The valve chamber 27 is connected to the second fluid chamber $R_2$ by way of the passages 24, 25 and 26. A compression coil spring 43 is engaged at one end thereof with an inner end wall of the rear housing 21A and at the other end thereof with an inner shoulder 42a of the large diameter piston 42 through an annular retainer 43A. Thus, the large diameter piston 42 is normally biased towards the second fluid chamber $R_2$ and abuts against the end wall of the large diameter portion 22b of bore 22 until the pressure in the second fluid chamber $R_2$ reaches a predetermined value $P_2$, as shown in FIG. 3.

The inertia-controlled ball 44 housed within the valve chamber 27 is free to roll forwardly up the inclined bottom of the chamber 27 and co-operates with an annular valve seat 45 secured to the side wall of chamber 27 to provide a cut-off valve V. The ball 44 normally rests under gravity in the position shown in the drawing and is received by a support plate 46 which is interposed between the front and rear housings 21B and 21A. The support plate 46 is provided with an orifice 46a permitting the flow of fluid between the passage 23 and the valve chamber 27. In braking operation, when the rate of deceleration caused by the application of the brake exceeds a predetermined value, the ball 44 will roll forwardly due to the inertia force acting thereon towards the valve seat 45 so that the cut-off valve V is closed to interrupt fluid communication between the first and second fluid chambers $R_1$ and $R_2$.

Figure 2:
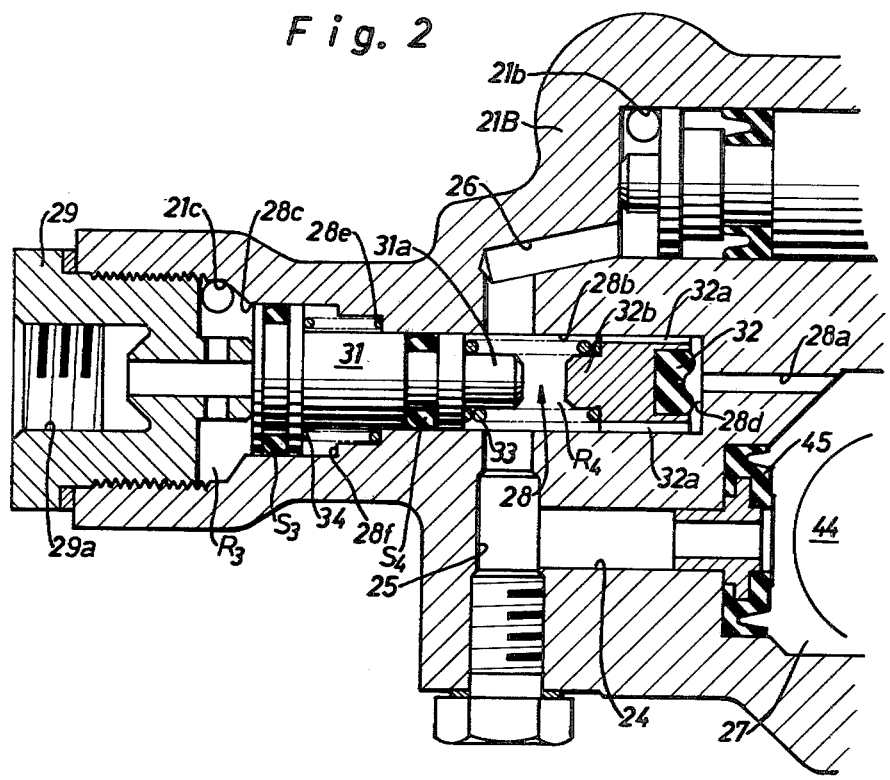
FIG. 2 is an enlarged sectional view showing a check valve assembly of the control device.

As clearly seen in FIG. 2, the front housing 21B is further provided with a second cylindrical stepped bore 28 which is connected to the upper portion of the valve chamber 27 through a bypass 28a. The second stepped bore 28 includes a small diameter portion 28b crossing the passage 25 and a large diameter portion 28c in open communication with second inlet and outlet ports 29a and 21c. The second inlet port 29a is formed within a plug member 29 threaded into the front housing 21B and is connected to the front pressure chamber 11 of master cylinder 10 by way of coduit 18, as shown in FIG. 1. On the other hand, the second outlet port 21c is connected to the front wheel brake cylinders 15 by way of conduit 19. Within the second stepped bore 28, there is provided a check valve assembly including a stepped piston 31, a valve element 32 and a coil spring 33. The piston 31 is reciprocably engaged within the large and small diameter portions 28c, 28b of bore 28 via annular seal members $S_3$, $S_4$ to form a third fluid chamber $R_3$ into which the second inlet and outlet ports 29a, 21c open. The stepped piston 31 is normally biased towards the plug member 29 by means of a compression coil spring 34 engaged at its rear end with an inner shoulder 28e of the stepped bore 28. The reciprocating movement of stepped piston 31 is restricted in a predetermined stroke by abutments against an inner projection of the plug member 29 and an inner shoulder 28f of the stepped bore 28.

The valve element 32 is reciprocably engaged within the small diameter portion 28b of stepped bore 28 to form a fourth fluid chamber $R_4$ and is separated from an inner boss 31a of the piston 31 with an appropriate space. The valve element 32 is provided at its outer periphery with axial recesses 32a to provide fluid communication between the bypass passage 28a and the passage 25. The coil spring 33 is fixed at one end thereof with an inner boss 32b of valve element 32 and at the other end thereof with the inner boss 31a of piston 31. When the stepped piston 31 is moved rearwardly due to the pressure in the third fluid chamber $R_3$, the spring 33 acts to resiliently abut the valve element 32 against an annular valve seat 28d. Thus, the valve element 32 acts to control the flow of fluid between the passages 28a and 25 in accordance with biasing force of the spring 33. During abutment of the stepped piston 31 against the plug member 29, the coil spring 33 separates the valve element 32 from the valve seat 28d so as to permit the flow of fluid between the passages 28a and 25.

In mounting process, the control device 20 first is fixedly mounted in position under the vehicle body floor at an inclined angle. Thus, the control device 20 is connected at its inlet port 21a with the rear pressure chamber 12 of master cylinder 10 by means of the conduit 16 and connected at its outlet port 21b with the rear wheel brake cylinders 14 by means of the conduit 17. Thereafter, bleed plugs (not shown) provided on the rear wheel brake cylinders 14 are released to supply brake fluid into the brake system with the control device 20. Under this condition, when the master cylinder 10 is operated by repeated depression of the brake pedal 13, brake fluid supplied into the rear pressure chamber 12 of master cylinder 10 is delivered into the first fluid chamber $R_1$ of control device 20 through the conduit 16 and the inlet port 21a. The supplied fluid then flows into the valve chamber 27 through the passage 23 and the orifice 46a of support plate 46. The brake fluid in valve chamber 27 then reaches the second fluid chamber $R_2$ through the valve seat 45 and the passages 24, 25, 26 and flows into the rear wheel brake cylinders 14 through the outlet port 21b and the conduit 17 to be finally drained out from the bleed plugs.

During the fluid delivery process as mentioned above, the third fluid chamber $R_3$ of control device 20 may not be supplied with the brake fluid. Thus, the stepped piston 31 is engaged with the inner projection of plug member 29 due to resilient force of the spring 34, and the valve element 32 is separated from the valve seat 28d to permit the flow of fluid between the passages 28a and 25. In this instance, occasionally the inertia-controlled ball 44 seats on the valve seat 45 by pressure of the brake fluid passing through the orifice 46a of support plate 46. In such a case, the fluid runs through the bypass passage 28a and the passage 25 towards the second fluid chamber $R_2$. This serves to purge the air remained in the upper portion of the valve chamber 27. The air then passes together with the fluid through the outlet port 21b and the conduit 17 to reach the rear wheel brake cylinders 14 finally to be drained out with the fluid from the bleed plugs. After the air-purging process is completed within the hydraulic circuit for the rear wheel brake cylinders 14, the bleed plugs are closed, and the control device 20 is further connected at its second inlet port 29a with the front pressure chamber 11 of master cylinder 10 by means of the conduit 18 and its second outlet port 21c with the front wheel brake cylinders 15 by means of the conduit 19. After the mounting process of the control device 20 is completed, the hydraulic circuit for the front wheel brake cylinders 15 is charged with brake fluid as well as the fluid delivery process for the rear wheel brake cylinders 14.

Under the unloaded condition of the vehicle, depression of the brake pedal 13 produces fluid pressure within the respective pressure chambers 11 and 12 of the master cylinder 10. The pressure in the front pressure chamber 11 is applied directly to the front wheel brake cylinders 15 through the conduit 18, the third chamber $R_3$ of control device 20 and the conduit 19, while the pressure in the rear pressure chamber 12 is applied to the inlet port 21a of control device 20 through the conduit 16. The master cylinder pressure Pm applied to the inlet port 21a is applied to the second fluid chamber $R_2$ via the first fluid chamber $R_1$, the passage 23, the valve chamber 27, the valve seat 45 and the passages 24, 25, 26 in sequence and, then, applied to the rear wheel brake cylinders 14 through the outlet port 21b and the conduit 17 to operate the rear wheel brake. Thus, the vehicle is braked in accordance with the value of the master cylinder pressure Pm applied to the front and rear wheel brake cylinders 15 and 14. At the initial stage of this braking operation, due to a difference in pressures acting on the smaller and larger ends of the stepped piston 31, the piston 31 is moved against biasing force of the spring 34 in the rearward direction to be engaged with the inner shoulder 28f of stepped bore 28, and the ball 44 still rests under gravity in the position. As a result of rearward movement of the piston 31, the valve element 32 seats on the valve seat 28d due to resilient force of the spring 33 to close the bypass passage 28a. In addition, the small diameter piston 41 is urged forwardly by the pressure in the first fluid chamber $R_1$, and the large diameter piston 42 is urged rearwardly by the pressure in the second fluid chamber $R_3$. In this instance, the rightward movement of the piston 42 is restricted by the resilient force of coil spring 43.

When the rate of deceleration caused by the application of the brakes exceeds a predetermined value, the ball 44 rolls forwardly towards the valve seat 45 due to the inertia force acting thereon so that the cut-off valve V is closed to interrupt the fluid communication between the valve chamber 27 and the passage 24, which is indicated by a character A in FIG. 3. At this stage, even when the master cylinder pressure Pm increases, the small and large diameter pistons 41 and 42 do not move forwardly, and the pressure Pw in the second fluid chamber $R_2$ and the rear wheel brake cylinders does not increase. The ball 44 is further held on the valve seat 45 due to the inertia force and the difference in pressure between the first and second fluid chambers $R_1$ and $R_2$, and the valve element 32 is also held on the valve seat 28d due to the resilient force of spring 33.

Subsequently, when the master cylinder pressure Pm increases up to a value $P_4$ by continued depression of the brake pedal 13, a pressure difference $P_0$ occurs between the bypass passage 28a and the passage 25. Then, the valve element 42 moves forwardly against the resilient force of spling 33 to temporarily open the bypass passage 28a. This valving operation is repeated in accordance with the increase of the master cylinder pressure Pm so that the pressure in the rear wheel brake cylinders 14 increases as indicated by a segment line B–C in FIG. 3.

Under the loaded condition of the vehicle, when the brake pedal 13 is depressed to apply the master cylinder pressure Pm from the master cylinder 10 to the front and rear wheel brake cylinders 15 and 14 in the same process as described above, the large diameter piston 42 moves toward the rearward stroke end thereof together with the small diameter piston 41 due to the pressure in the second fluid chamber $R_2$ against the resilient force of coil spring 43, because the pressure Pw in the rear wheel brake cylinders 14 increases above the predetermined value $P_2$ before the cut-off valve V is closed. In this braking operation, when the inertia force acting on the ball 44 exceeds the predetermined value, the ball 44 rolls forwardly up the bottom surface of the valve chamber 27 to close the cut-off valve V so that the fluid communication between the first and second fluid chambers $R_1$ and $R_2$ is blocked, which is indicated by a character a in FIG. 3.

If the master cylinder pressure Pm is increased by continued depression of the brake pedal 13, the pressure acting on the small diameter piston 41 moves the large diameter piston 42 forwardly. The large diameter piston 42 acts on the fluid trapped in the conduit 17 to the rear wheel brake cylinders 14 due to the closing of the cut-off valve V and increases the pressure in the conduit 17, but, owing to the difference between the effective pressure receiving areas of the pistons 41 and 42, the rate of increase is less than the rate of increase in the master cylinder pressure Pm, as indicated by a segment line between characters a and b in FIG. 3. Subsequently, when the master cylinder pressure Pm reaches a value $P_5$, the large diameter piston 42 abuts against the end wall of the large diameter portion 22b of bore 22 to temporarily discontinue the pressure increase in the conduit 17. Until the master cylinder pressure Pm reaches a value $P_6$, the pressure control will continue, as indicated by a segment line between characters b and c in FIG. 3.

When the master cylinder pressure Pm further increases up to the value $P_6$, a pressure difference $P_0$ occurs between the bypass passage 28a and the passage 25. Then, the valve element 32 moves forwardly against the resilient force of spring 33 to temporarily open the bypass passage 28a. This valving operation is repeated in accordance with the increase of the master cylinder pressure Pm such that the pressure in the rear wheel brake cylinders 14 increases as indicated by a segment line between characters c and C in FIG. 3.

From the operational function described above, it will be understood that due to the pressure difference $P_0$ between the bypass passage 28a and the passage 25, the valve element 32 separates from the valve seat 28d against the spring 33 to open the bypass passage 28a. Thus, the bypass passage 28a acts to provide fluid communication between the first and second fluid chambers $R_1$ and $R_2$ even if the cut-off valve V is erroneously closed at a premature timing. This serves to avoid an unexpected insufficient braking effort of the rear brakes. If the hydraulic circuit for the front wheel brake cylinders 15 is damaged during braking operation, the pressure in the third fluid chamber $R_3$ of control device 20 becomes null. Then, the stepped piston 31 is immediately moved forwardly by biasing force of the spring 34 and the pressure in the fourth fluid chamber $R_4$, abutting against the inner projection of plug member 29. In this instance, the valve element 32 is separated from the valve seat 28d in response to the forward movement of the piston 31 so that the bypass passage 28a opens to provide fluid communication between the first and second fluid chambers $R_1$ and $R_2$. As a result, the master cylinder pressure Pm is directly applied to the rear wheel brake cylinders 14 regardless of operations of the cut-off valve V and the differential pistions 41, 42. Thus, the rear wheel cylinder pressure Pw is increased in proportion to the value of the master cylinder pressure Pm, as indicated by an imaginary line O–A–a–D in FIG. 3. This means that the function of the control device 20 becomes ineffective to avoid an unexpected insufficient braking effort of the rear wheel brakes.

Although a certain specific embodiment of this invention has been illustrated and described, it is obvious that many modifications thereof are possible. The invention, therefore, is not intended to be restricted to the exact showing of the drawings and description thereof, but is considered to include reasonable and obvious equivalents.

What is claimed is:

1. In an hydraulic brake pressure control device for incorporation in a vehicle braking system including a tandem master cylinder, a first hydraulic circuit connecting a first pressure chamber of said master cylinder to front wheel brake cylinders, and a second hydraulic circuit connecting a second pressure chamber of said master cylinder to rear wheel brake cylinders, which comprises:
   a housing for interposition within said second hydraulic circuit, said housing being provided with (a) an inlet port for connection to the second pressure chamber of said master cylinder, (b) an outlet port for connection to said rear wheel brake cylinders, (c) a valve chamber communicating at one end thereof with said inlet port and at the other end thereof with said outlet port, and (d) a bypass passage communicating between said valve chamber and said outlet port to permit the escape of air from said valve chamber; and
   a cut-off valve assembly including (a) a valve seat provided in said valve chamber to permit the flow of fluid between said inlet and outlet ports, and (b) an inertia-controlled valve element located within said valve chamber to co-operate with said valve seat to interrupt the flow of fluid from said inlet port to said outlet port when said valve element is subjected to a deceleration in excess of a predetermined value;
   the improvement comprising:
   a stepped bore provided within the housing coaxially with said bypass passage, said bore having a small diameter portion opening towards said bypass passage and a larger diameter portion for interposition within said first hydraulic circuit;
   a stepped piston reciprocable in a limited stroke within said stepped bore to form a fluid chamber disposed within said first hydraulic circuit, said piston being exposed at the smaller end thereof in the small diamter portion of said bore and at the larger end thereof in said fluid chamber;
   a check valve including a second valve seat provided in the small diameter portion of said bore to permit the flow of fluid through said bypass passage, and a valve element reciprocable within the small diameter portion of said bore to co-operate with said second valve seat to open and close said bypass passage; and
   resilient means interposed between said valve element and said piston to engage said valve element with said second valve seat when said piston is moved towards said bypass passage due to the pressure in said fluid chamber.

2. The improvement as claimed in claim 1, wherein a compression spring is supported at its one end by an inner shoulder of said stepped bore to bias said stepped piston towards said fluid chamber.

3. The improvement as claimed in claim 1 or 2, wherein said valve element is provided at the outer periphery thereof with an axial recess to permit the fluid flowing through said second valve seat and bypass passage.

4. The improvement as claimed in claim 1, wherein said resilient means is a coil spring fixed at one end thereof with an inner boss of said valve element and at the other end thereof with an inner boss of said stepped piston.

* * * * *

UNITED STATES PATENT AND TRADEMARK OFFICE
CERTIFICATE OF CORRECTION

PATENT NO. : 4,198,100
DATED : April 15, 1980
INVENTOR(S) : Tomoyuki Nogami

It is certified that error appears in the above—identified patent and that said Letters Patent is hereby corrected as shown below:

Col. 1, line 20, change "brake" to --braking--.

Col. 3, line 42, after "bypass" insert --passage--.

Col. 5, line 57, change "42" to --32--.

Col. 8, line 4, change "the" to --said--.

Col. 8, line 13, correct spelling of "diameter".

Signed and Sealed this

Ninth Day of September 1980

[SEAL]

*Attest:*

SIDNEY A. DIAMOND

*Attesting Officer*     *Commissioner of Patents and Trademarks*